(12) United States Patent
Pong

(10) Patent No.: US 7,231,651 B2
(45) Date of Patent: Jun. 12, 2007

(54) SYSTEM AND METHOD FOR INSERTION AND MODIFICATION OF ADVERTISEMENTS

(76) Inventor: Ta-Ching Pong, 5F, No. 8, Sublane 9, Lane 267, Pa Teh Rd., Sec. 2, Taipei (TW)

( * ) Notice: Subject to any disclaimer, the term of this patent is extended or adjusted under 35 U.S.C. 154(b) by 414 days.

(21) Appl. No.: 09/881,815

(22) Filed: Jun. 18, 2001

(65) Prior Publication Data

US 2002/0194590 A1 Dec. 19, 2002

(51) Int. Cl.
*H04N 7/10* (2006.01)

(52) U.S. Cl. .............................. 725/32; 725/36; 725/61; 725/140; 348/586

(58) Field of Classification Search ........ 348/584–589, 348/598–600, 563–565, 578, 592; 725/157, 725/32, 34–36, 60, 61, 24, 132, 140, 152
See application file for complete search history.

(56) References Cited

U.S. PATENT DOCUMENTS

| | | | |
|---|---|---|---|
| 5,264,933 A * | 11/1993 | Rosser et al. ................ | 348/578 |
| 5,491,517 A * | 2/1996 | Kreitman et al. ........... | 348/581 |
| 5,524,195 A | 6/1996 | Clanton, III et al. | |
| 5,729,279 A | 3/1998 | Fuller | |
| 5,892,554 A * | 4/1999 | DiCicco et al. ............. | 348/584 |
| 6,172,677 B1 * | 1/2001 | Stautner et al. ............. | 345/716 |
| 6,208,386 B1 * | 3/2001 | Wilf et al. ................... | 348/578 |
| 6,208,387 B1 * | 3/2001 | Magnusson et al. ........ | 348/578 |
| 6,282,713 B1 * | 8/2001 | Kitsukawa et al. ........... | 725/36 |
| 6,604,239 B1 * | 8/2003 | Kohen .......................... | 725/13 |
| 6,618,858 B1 * | 9/2003 | Gautier ....................... | 725/132 |
| 6,750,919 B1 * | 6/2004 | Rosser ........................ | 348/584 |
| 2001/0027559 A1 * | 10/2001 | Tanabe et al. ................. | 725/1 |
| 2002/0016965 A1 * | 2/2002 | Tomsen ........................ | 725/42 |
| 2002/0083469 A1 * | 6/2002 | Jeannin et al. .............. | 725/135 |

FOREIGN PATENT DOCUMENTS

| | | |
|---|---|---|
| EP | 1236487 A2 | 4/2002 |
| WO | WO 98/28906 * | 7/1998 |

* cited by examiner

*Primary Examiner*—Ngoc Vu
(74) *Attorney, Agent, or Firm*—Bacon & Thomas, PLLC

(57) ABSTRACT

Advertisements or commercials are integrated into an entertainment program or display by designating locations or fields in the entertainment program or display into which targeted advertisements or commercials may in inserted and/or modified, so that the advertisements blend into the scene in which they are inserted without disrupting the entertainment program or display.

13 Claims, 14 Drawing Sheets

SYSTEM AND METHOD FOR INSERTION AND MODIFICATION OF ADVERTISEMENTS

BACKGROUND OF THE INVENTION

1. Field of the Invention

This invention relates to advertisements, commercials, or the like, and in particular to a system and method for integrating advertisements or commercials into an entertainment program or display by utilizing locations or fields in the entertainment program or display into which advertisements or commercials may be inserted and/or modified, so that the advertisements blend into the scene in which they are inserted without disrupting the entertainment program or display.

2. Background of the Invention

One of the fundamental elements of modern society is the pervasiveness of advertising or commercials. Advertising is everywhere, having penetrated every type of media, in every geographic location, and virtually every type of human activity, including marketing, education, elections, and governance. With the development of new media technologies, such as those associated with the Internet, advertising has become even more indispensable. Advertising, which has been with the Internet from its beginning, is essential to the growth of electronic commerce and the Internet in general.

Even as advertising has become more pervasive, its effectiveness has in many cases declined. Once a novelty, advertisements are now often regarded as an annoyance, or at best something to be ignored. As currently configured, advertisements tend to detract from the entertainment value of the programming or display into which they are inserted, either by entirely interrupting the program as in conventional television commercials, or by taking up space that could otherwise be used as part of the main program or display. Viewers have learned to ignore or even skip such commercials.

It is of course possible to insert advertisements into programs at the time of creation. For example, it is common in cinema to place products at positions where they might have a promotional effect, for example because characters in the cinema are using them. Furthermore, writers often have characters in entertainment programs offer messages or information, and sponsors of sports events often place advertisements in positions where they can be viewed as background for the main sports action. However, such "product placements" or messages lack immediacy. For example, it would be useless to integrate a campaign advertisement into a movie or television program since such programs are often created far in advance of broadcast or release, and the advertisement will certainly become outdated by the time the program is re-run or re-released.

SUMMARY OF THE INVENTION

It is accordingly an objective of the invention to provide an advertising system and method which permits advertisements to be integrated into a program or display, and yet which ensures that the advertisements thus inserted are up-to-date.

It is a further objective of the invention to provide an advertising system and method which permits advertisements to not only be integrated into a program or display, but which permits the advertisements to be targeted to selected viewers.

It is yet another objective of the invention to provide an advertising system and method which permits advertisements to be integrated into a program or display, in a way that is not likely to annoy the viewer.

It is a still further objective of the invention to provide an advertising system and method which permits advertisements to be integrated into a program or display broadcast or transmitted over a wide variety of communications media.

These objectives are accomplished in accordance with the principles of a preferred embodiment of the invention, by providing an advertising system and method in which particular images or fields in the program or display are designated for insertion of advertisements. For example, during broadcast of a sporting event, locations corresponding to signs, posters, or banners surrounding the playing area, portions of the playing field, the surface of an airship hovering over the event, or any other area that does not detract from viewing of the sporting event, may be designated to receive inserted advertisements. Similarly, during broadcast of a golf tournament, the areas surrounding the fairways or greens, such as water traps, galleries, and so forth may receive the inserted advertisements, while during broadcast of a concert or music video, the advertisements could be inserted as the stage background. Alternatively, scenes in a digitally recorded movie may be modified to include advertising or commercials using conventional computer-based image processing techniques, for example by including a political message on a billboard seen in the background of the scene from the movie, or the advertisements may be inserted into Internet webpages in a manner which blends into images displayed on the webpages, the user being given the option of expanding the advertisements for a more detailed view and or performance of a transaction.

In one preferred embodiment of the invention, the advertisement is in the form of HTML (or any other suitable programming languages) implemented content to be merged with an entertainment program, such as an interactive gaming program, viewed on a computer or microprocessor based entertainment system and designed in a way that reflects the content of the program. The introduction of more authentic simulation images that imitate the "real life" environment within the entertainment program is the target of many computer based entertainment systems, and the present invention makes use of the resulting trend towards improved resolution of display devices and increased image processing power, such as is found in the 3D display driver board of a personal computer or the personal entertainment console of a big screen movie entertainment system, by blending the advertisement into the image field of the program or display. Once the initial programming or image is properly designed or arranged, the advertising and/or commercials sponsor (or other entities) can modify the image content during processing of the image field by the CPU/memory processing unit of the related signal processing unit or user "box" that including the necessary processing hardware.

Such modification can be done to reflect geographical location related content or content of nationwide or worldwide interest. The modification process can be done via interconnected communicating systems between, but not limited to: 1. the advertising or/and commercial sponsor; 2. the "image displaying system" sponsor or/and provider, such as on-line entertainment system operator; and 3. the "receiving party", either on-line or off-line.

While the present invention concerns an advertising system, and in particular a system and method which permits placement of "advertising" or "commercials" into programs or displays, those skilled in the art will appreciate that the terms "advertising" and "commercials" are to be understood in their broadest sense, i.e., the words "advertising" and "commercials" are intended to cover, by way of example and without limitation, all types of messages, information, or images intended to be inserted into a program or display, the content of which is not directly related to the content of the program or display into which it is inserted. The messages or information conveyed by the "advertisements" of the invention may be used, for example, to market a product or service or to convey other types of messages or information, such as those associated with a political campaign, and may be delivered over any type of medium, including conventional broadcast television or "TV," the Internet, and any other communications or entertainment medium capable of carrying messages, information, or images, including cable and wireless communications networks, WAP or GPRS networks, interactive video systems, interactive gaming networks, personal video consoles or game machines, cinema, and so forth.

DETAILED DESCRIPTION OF THE PREFERRED EMBODIMENTS

As is shown in the TV advertising or on almost any web page on the Internet environment, advertising or/and commercials are conventionally arranged as independent items or separate items in the image field being displayed. The location and content of the advertisement is either integrated into the program or display during the design stage of the entertainment program, or the program or display must be interrupted to display the advertisement. However, according to the present invention, with the proper usage of available space, so-called "blue screen" or similar techniques, and software/hardware technology, such as plug-in, caching etc., the image is instead modified at the time or viewing, during an on-line process or during an off-line process.

Figure 1:
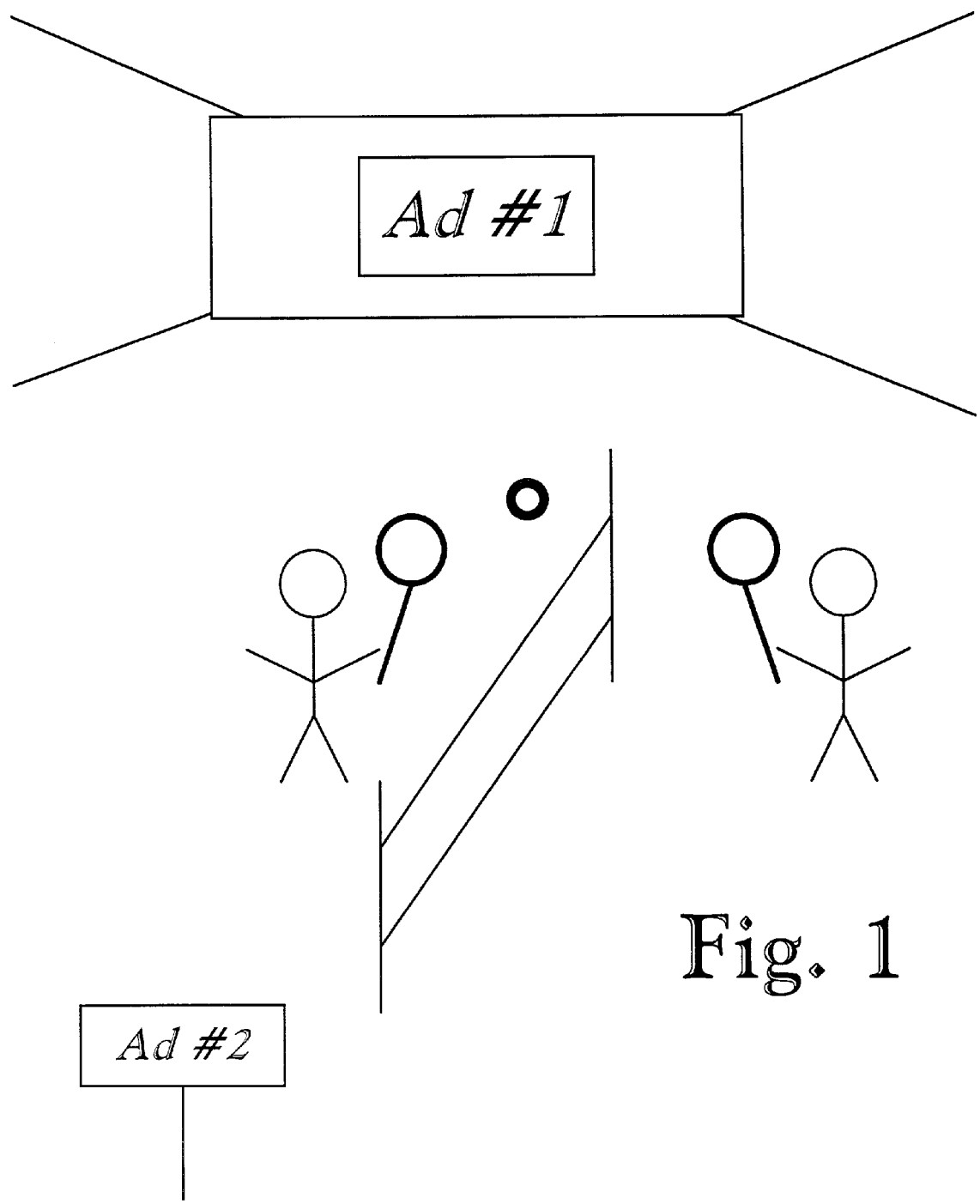
FIGS. 1–3 are simulated screen shots illustrating an example of advertisement insertion and modification according to the principles of a preferred embodiment of the invention.
Figure 2:
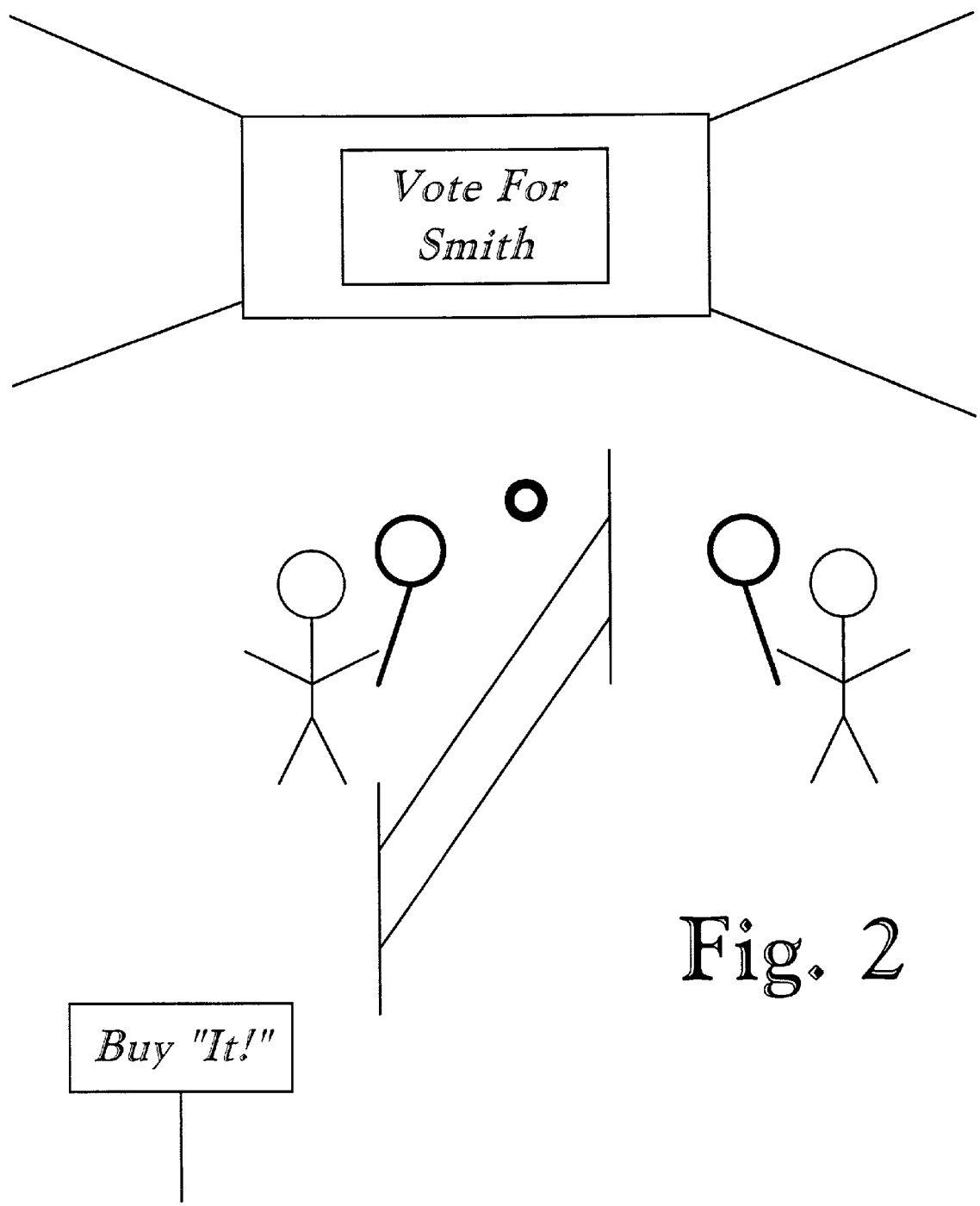
Figure 3:
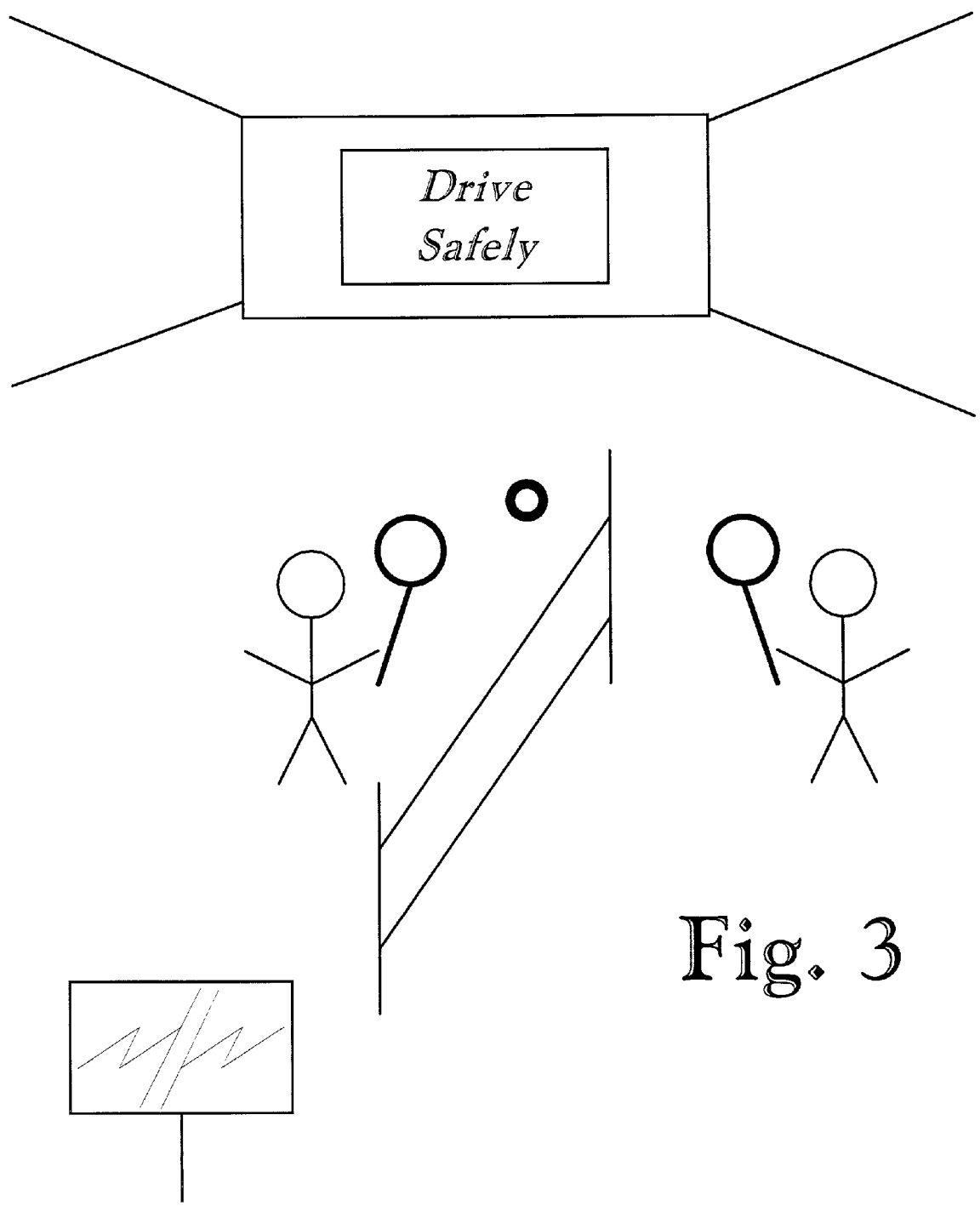

By way of example, as shown in FIG. 1, a sports program includes locations or fields where advertisements would normally be displayed during the sporting event. These are designated in FIG. 1 as ad #1 and ad #2. According to the invention, as the sporting event is being displayed, different advertisements are placed into field#1 and field#2, as indicated in FIGS. 2 and 3. For example, field#1 displays a campaign advertisement and then an educational message, while field #2 displays a product promotion and a corporate logo.

Figure 4:
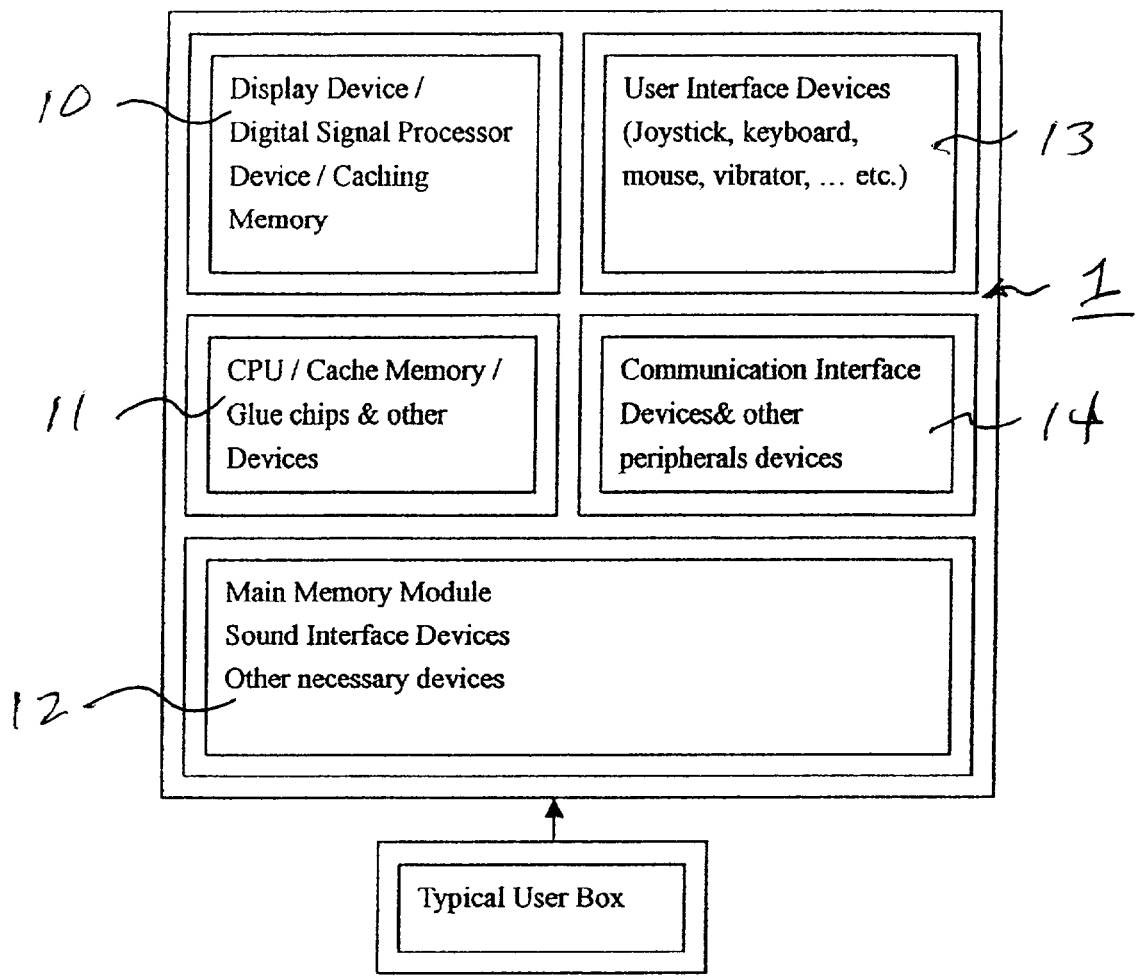
FIG. 4 is a functional block diagram of a user box capable of facilitating advertisement insertion or modification according to the principles of a preferred embodiment of the invention.

In the case of computer-based digital entertainment system, these advertisements may be inserted by the processor that displays the program, i.e., by a "box" or controller 1, as illustrated in FIG. 4. User "box" 1 may include a display device 10, including such elements as a digital signal processor and a caching memory; a central processing unit (CPU) 11 including for example a cache memory; a main memory module 12; user interface devices 13 such as a joystick, keyboard, mouse, and so forth; and a communication interface device 14. Alternatively, the advertisements may be merged using blue screen techniques, either at the studio prior to broadcast or, in some cases in a real-life environment. In the sporting field environment illustrated in FIGS. 1–3, for example, actual billboards or portions of the field on which the athletes are standing, areas of a golf course, or the display area of an airship, may simply be painted blue so that messages can be inserted. In a live music or music video environment, the stage background could similarly be painted blue.

Figure 5:
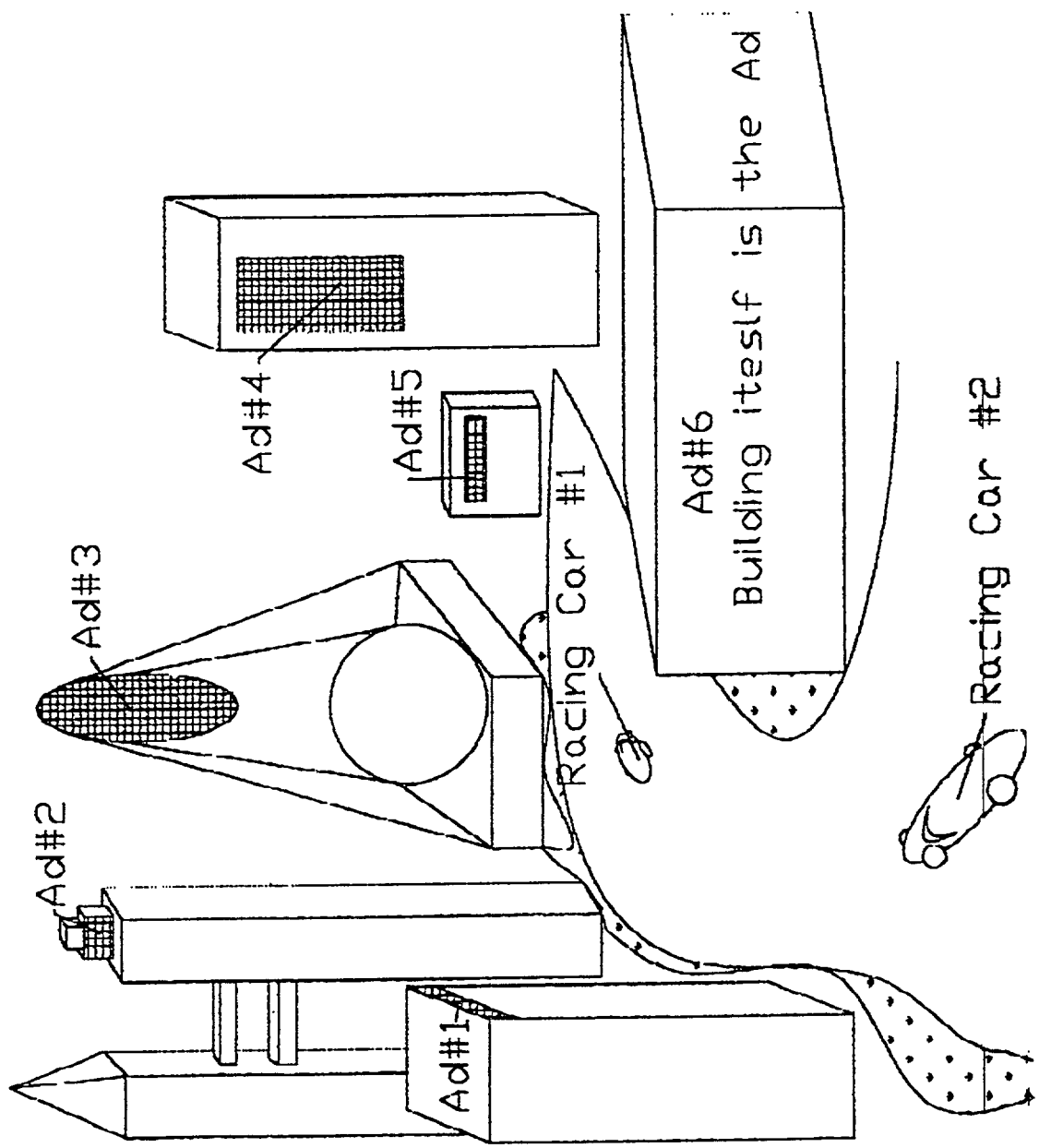
FIG. 5 is a screen shot illustrated another example of advertisement insertion and modification according to the principles of a preferred embodiment of the invention.
Figure 6:
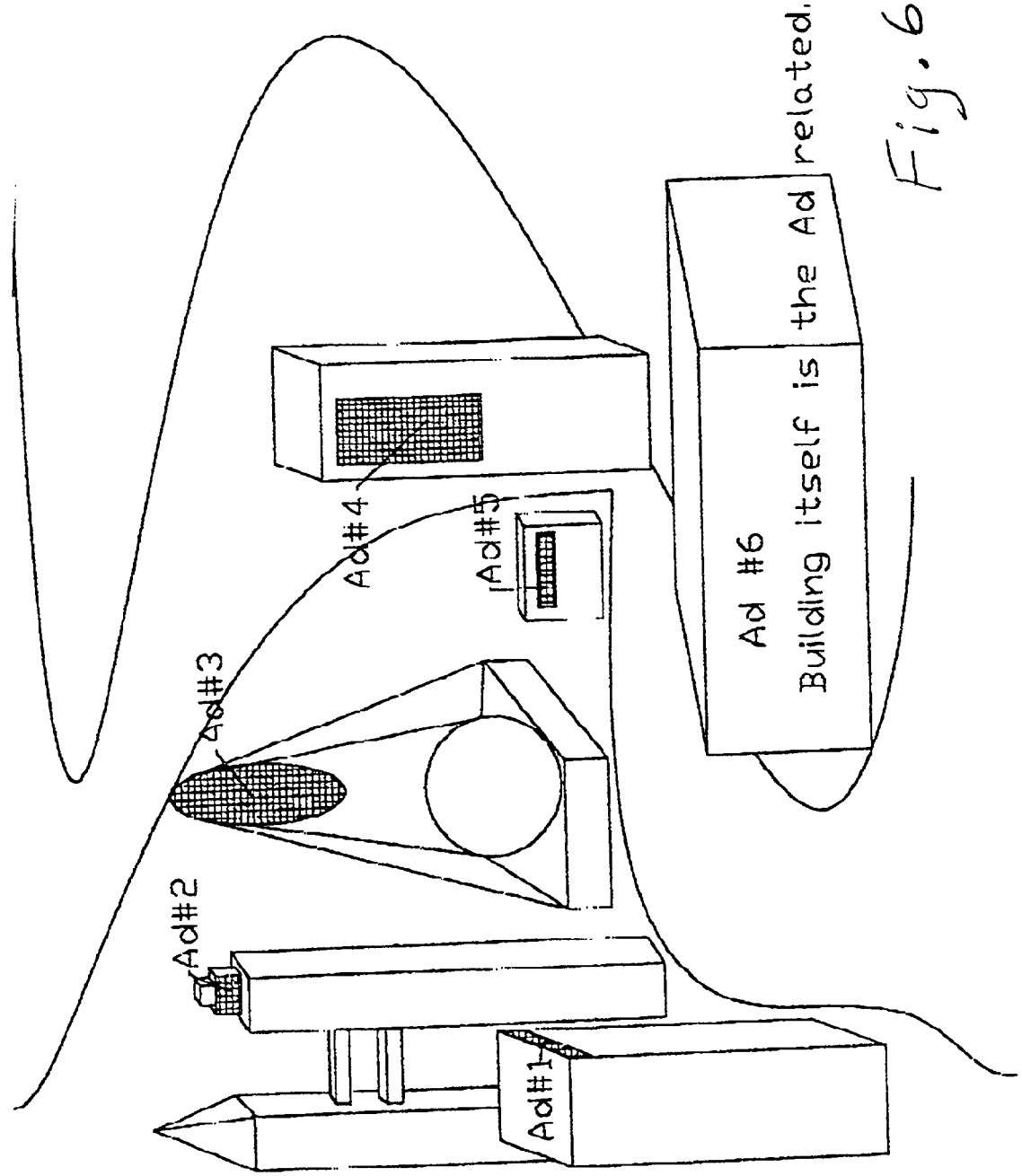
FIG. 6 is a screen shot illustrating yet another example of advertisement insertion and modification according to the principles of a preferred embodiment of the invention.

In the sports program or computer game depicted in FIG. 5, which is illustrated as but not limited to a car race, the fields designated as ad #1 and ad #2 might by arranged to display a campaign advertisement and/or educational message, while the fields designated ad #3, ad #4, ad#5 are arranged to display a product promotion and/or a corporate logo, and the field designated ad #6 is arranged to display a home sales promotion, each of the advertisements being inserted into the appropriate fields during the broadcast or during playing of the game. In the example shown in FIG. 6, the same types of advertisements are inserted into a background landscape or landscape planning program, without limitation to a sporting event, the advertisements again being inserted as the program event is being displayed.

Figure 7:
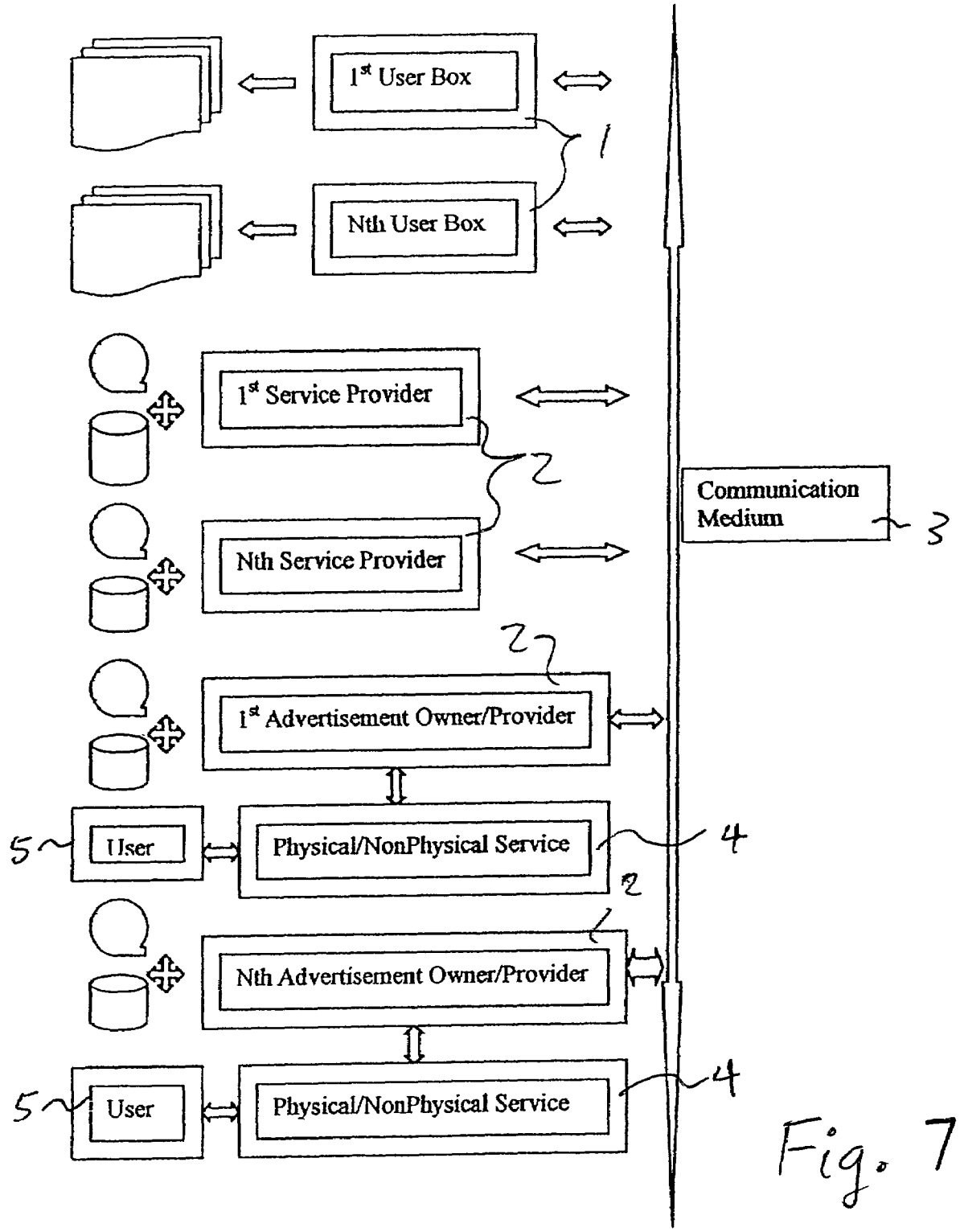
FIG. 7 is a functional block diagram of a system for implementing the preferred embodiment of the invention.
Figure 8:
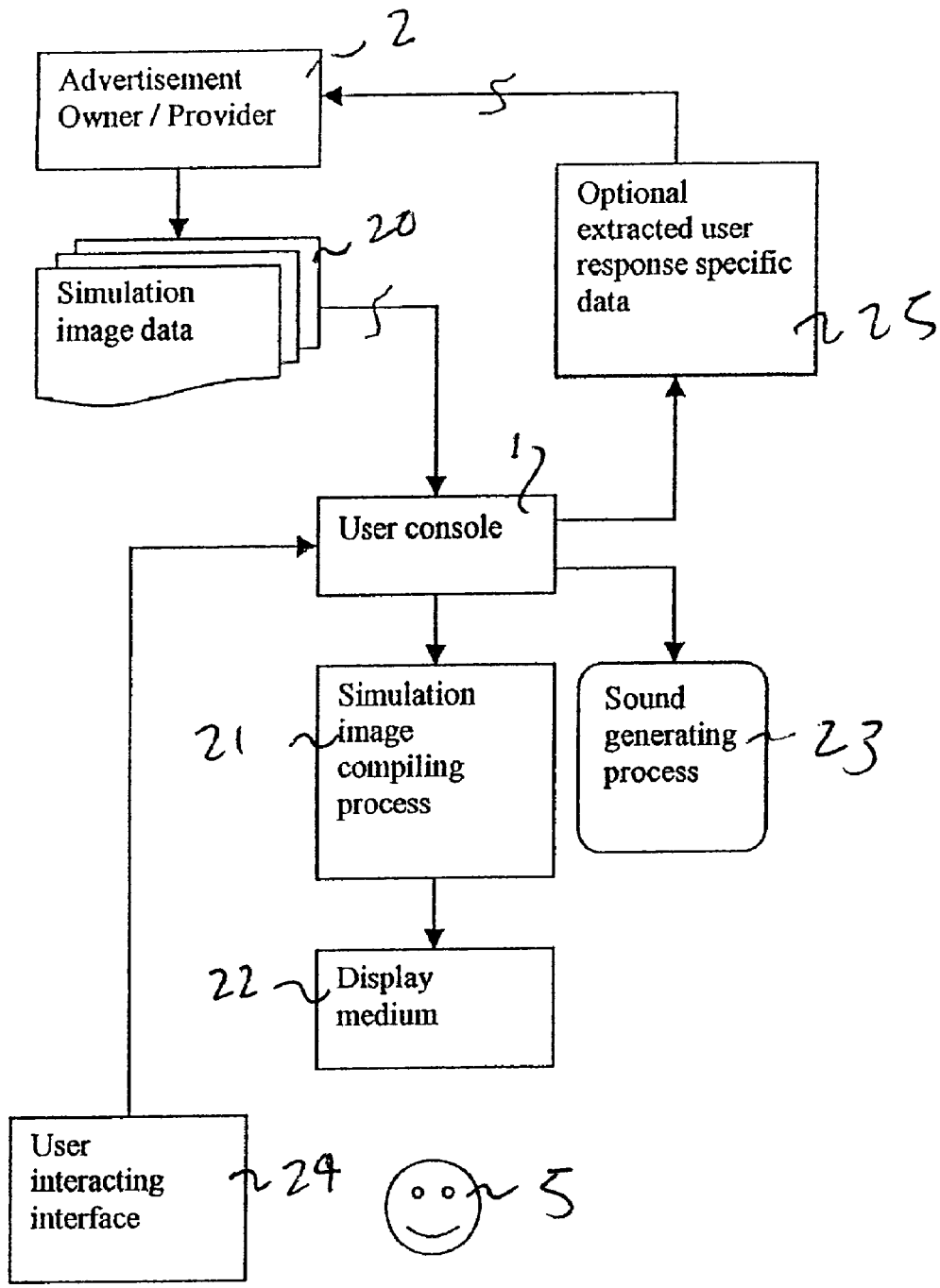
FIGS. 8–11 are block diagrams illustrating examples of different ways that advertising data or updates may be supplied to the user, and responses received, according to the preferred embodiment of the invention.

Regardless of the type of media 3, as illustrated in FIG. 7, the advertisements may be supplied to any or all of a plurality of user boxes or controller devices 1 from any of a variety of sources 2 seeking to advertise a product or service 4 to any user 5, the sources 2 including but not limited to nationwide or local sellers, sponsors, and/or owners of a product, service, event (such as a sporting event or concert), building, stadium, arena, field or other venue, to name just a few of the numerous possible types of sellers, sponsors, and/or owners that might serve as one of the sources 2. The sources might also include, without limitations, a national or local advertising or commercial sponsor, content provider/ hoster or owner, television broadcasting service sponsor and/or provider and/or owner, cable television service sponsor and/or provider and/or owner, television programming service sponsor and/or provider and/or owner, Internet broadcasting program service sponsor and/or provider and/ or owner, wireless broadcasting service sponsor and/or provider and/or owner, wireless communication service sponsor and/or provider and/or owner, WAP service sponsor and/or provider and/or owner, GPRS service sponsor and/or provider and/or owner, interactive video broadcasting program service sponsor and/or provider and/or owner, video on demand program service sponsor and/or provider and/or owner, interactive video program service sponsor and/or provider and/or owner, traditional/digital movie program service sponsor and/or provider and/or owner, interactive movie program service sponsor and/or provider and/or owner, cinema service sponsor and/or provider and/or owner, digital cinema service sponsor and/or provider and/or owner, interactive cinema service sponsor and/or provider and/or owner, communication service sponsor and/or provider and/or owner, Internet service sponsor and/or provider and/or owner, web page hoster and/or owner, computing device software sponsor and/or provider and/or owner, computing device hardware sponsor and/or provider and/or owner, and/or the simulation image creating device/program and/or user's display device sponsor and/or provider and/or owner. Each of these advertising sources may have its own unique identification identifier and specific geographical locations identifier.

Since the on-line process still poses some kind of time lag effect that can be seen in the presently available interconnecting communication process, updating or modification can also be done as a back stage process, i.e., the content and the image quality can be optimized prior to display, so that whenever the "receiving party" or user is viewing a particular image field that is available for such an advertisement, the most updated version of the advertising and/or commercials is shown to the user. The updates for the advertising and/or commercials can also be done as a Internet "link" so that when the receiving party selects the image that the receiving party is interested in, the receiving party can be given a complete series of advertising and/or commercials images and procedural description as to how to place suitable ordering information that is required to carry out a transaction that the user desires.

Figure 9:
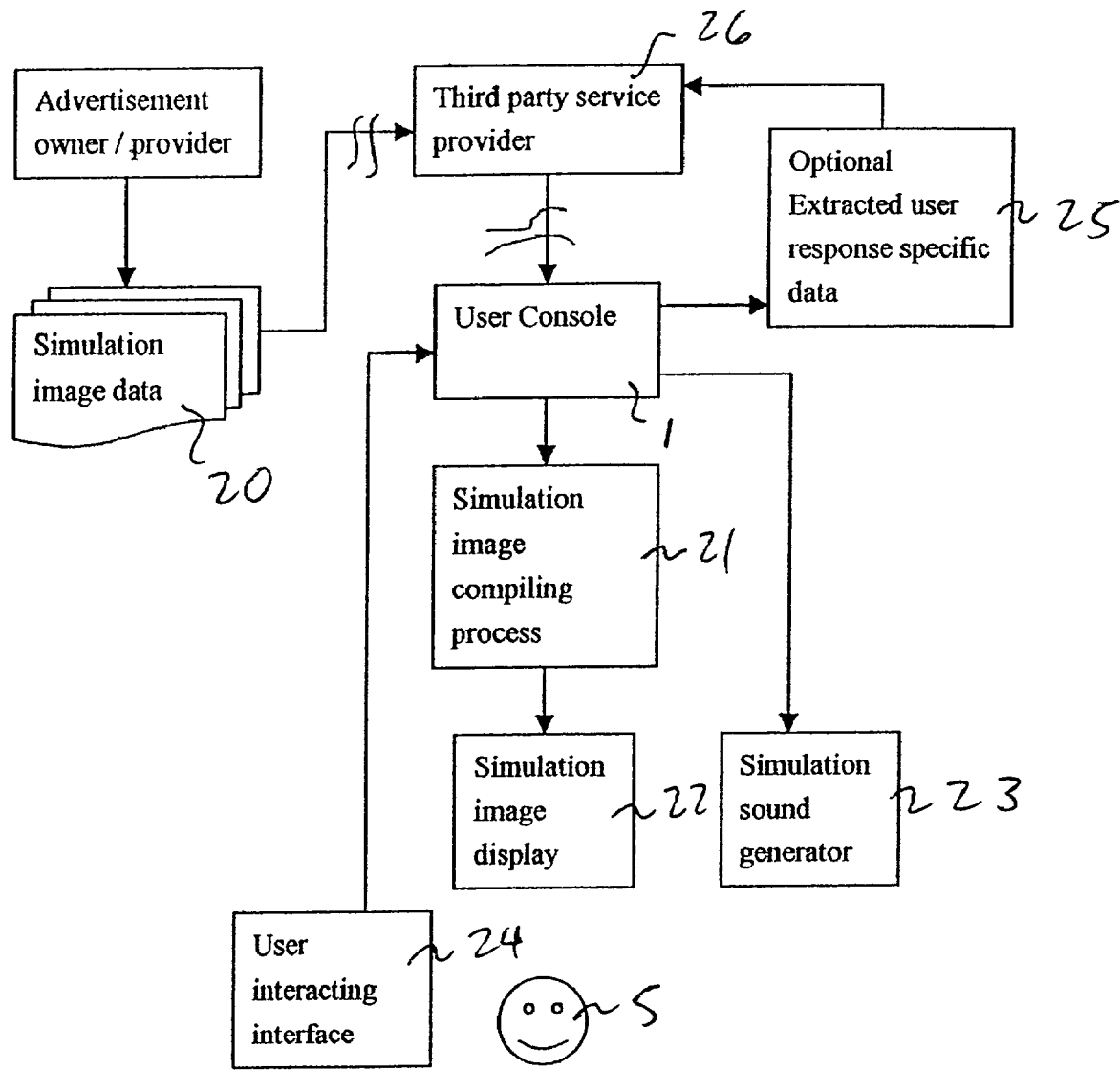
Figure 10:
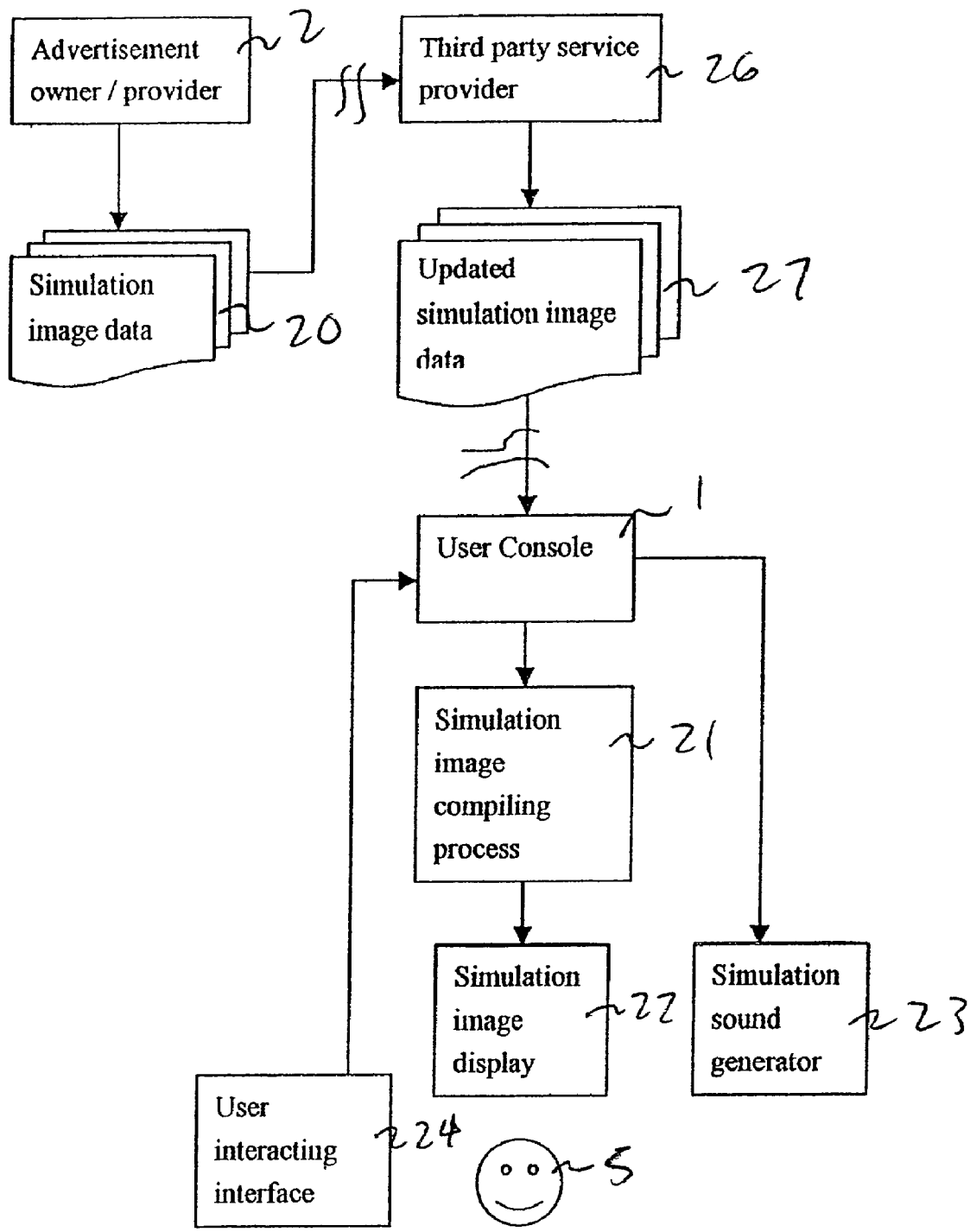
Figure 11:
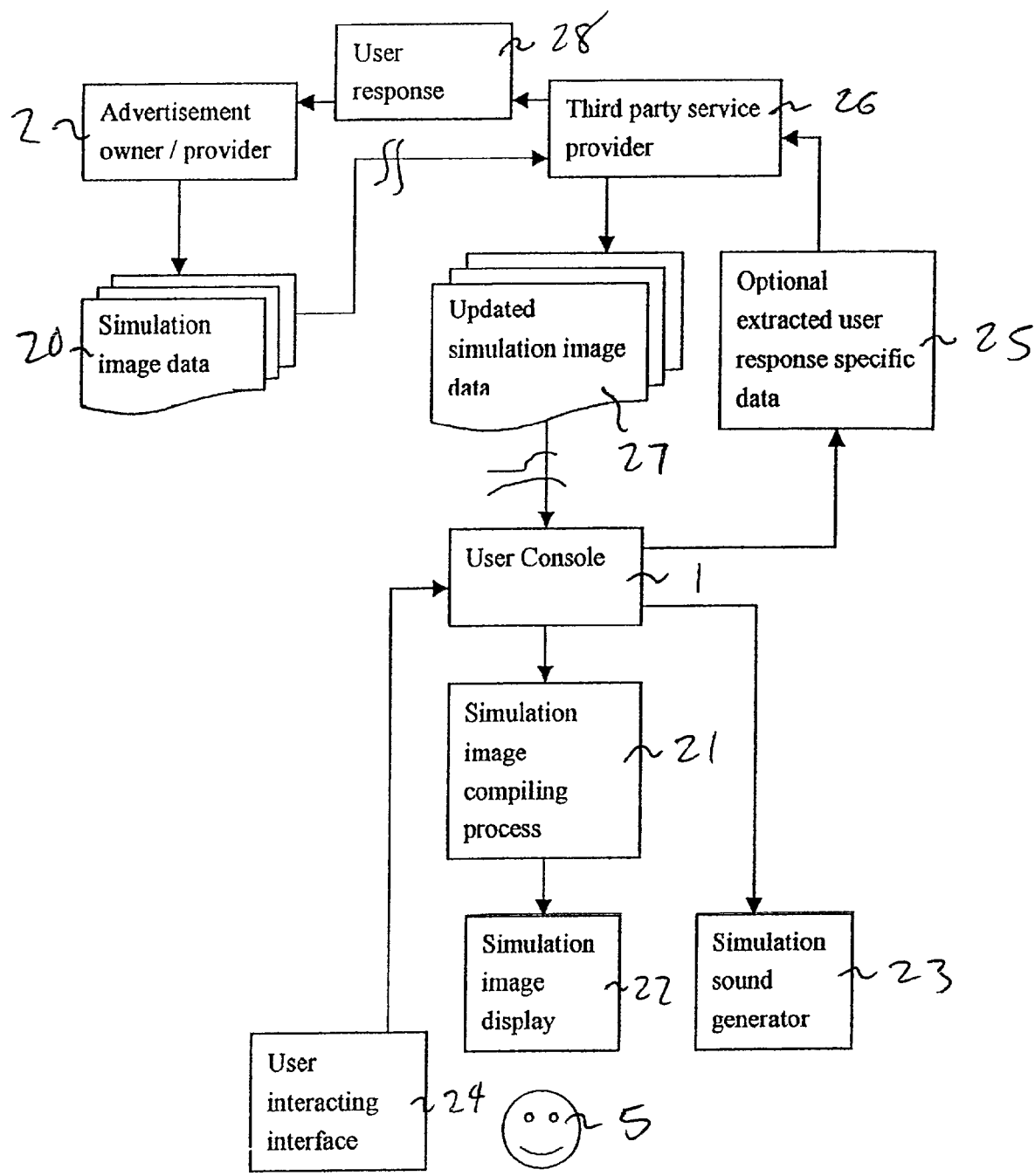

Examples of different ways that advertising data or updates can be supplied to the user, and responses received, are illustrated in FIGS. 8–11. In the process illustrated in FIG. 8, for example, the advertising source 2 provides simulation data 20 directly to the user box or console 1, which compiles the simulation data and generates a display that includes an advertisement in accordance with the principles of the invention, as indicated by block 21, and provides the display to a display medium 22, with appropriate sound effects as indicated by block 23. The user 5 responds through an appropriate user interface device 24 and response data 25, including responses to either the main program or responses to the advertisement are transmitted back to the source 2. Alternatively, as illustrated in FIG. 9, the advertising source 2 may provide the simulation data 20 to a third party service provider 26, which then provides the simulation data to a user console and receives response data 25 in a manner corresponding to that illustrated in FIG. 8. On the other hand, the advertising source 2 may provide the simulation data 20 to the third party service provider 26, which then updates the simulation image data, as indicated by block 27, and sends the updated simulation image data to the user console 1, as illustrated in FIG. 10. Finally, as illustrated in FIG. 11, data 25 received by the third party provider in response to updated simulation data 27 may be formatted and forwarded to the original source, as indicated by block 28, thereby providing two response "loops" through advertising can be targeted and refined depending on the responses.

Figure 12:
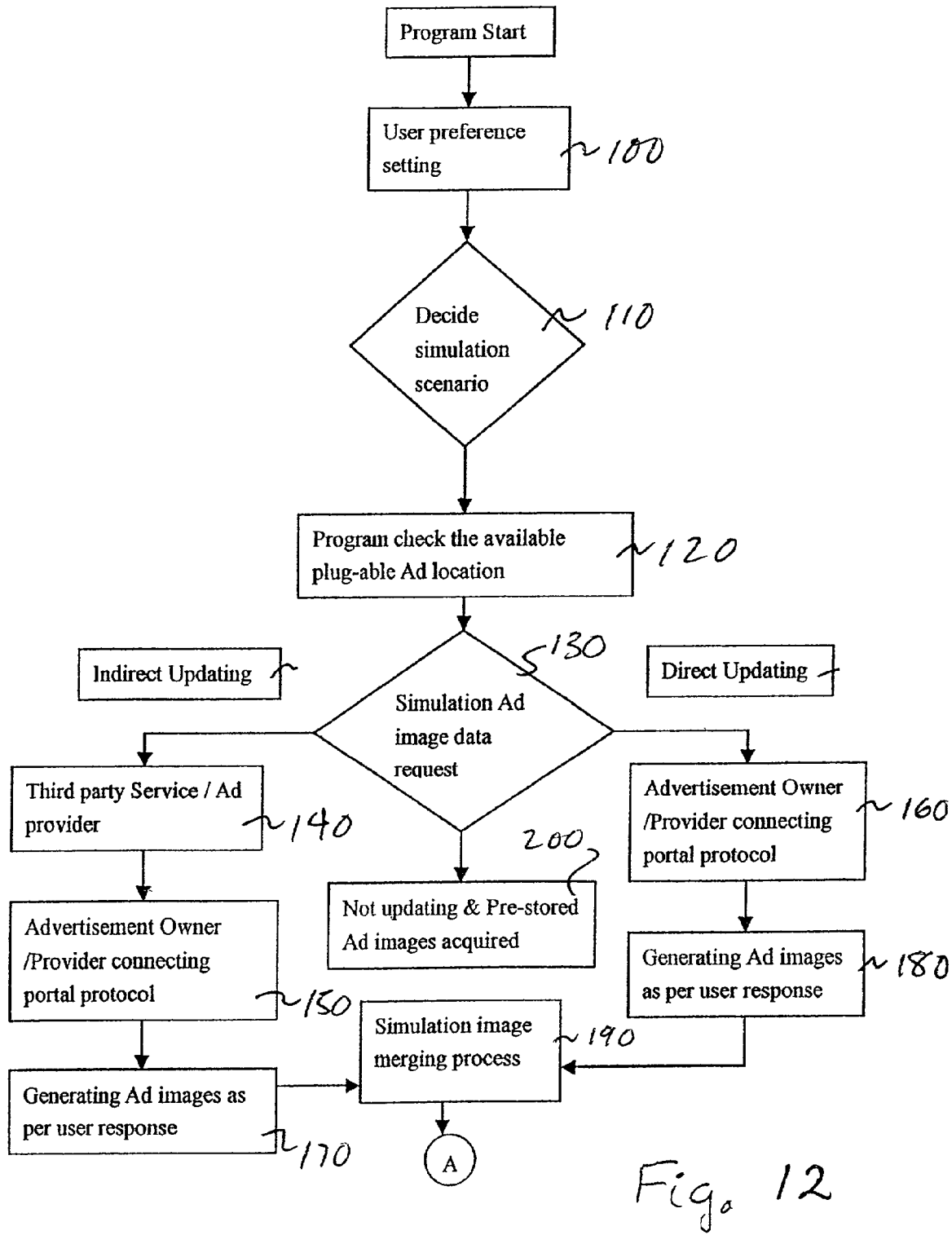
FIG. 12 is a flowchart of a control program for the user box or console 1 illustrated in FIGS. 8–11.

FIG. 12 is a flowchart of a control program for user box or console 1, which shows both direct and indirect updating of the advertisements. Initially, the control program provides the user with options concerning the program or "simulation scenario" to be viewed and the display of the advertisements, including by way of example, the option of whether to view updated advertisements (step 100). The control program then selects the program to be viewed (block 110) and checks for available locations into which advertisements may be inserted (block 120). A request that includes user preference data is then sent to the provider of the advertisements (step 130), either through a third party provider (step 140) which forwards the request to an owner/sponsor (step 150), or directly to the owner/sponsor (step 160). The owner/sponsor then supplies the advertisements to the controller (steps 170,180) for insertion (step 190). If the user does not wish to view updated advertisements, the controller may simply use stored images at the advertisement locations (step 200).

Figure 13:
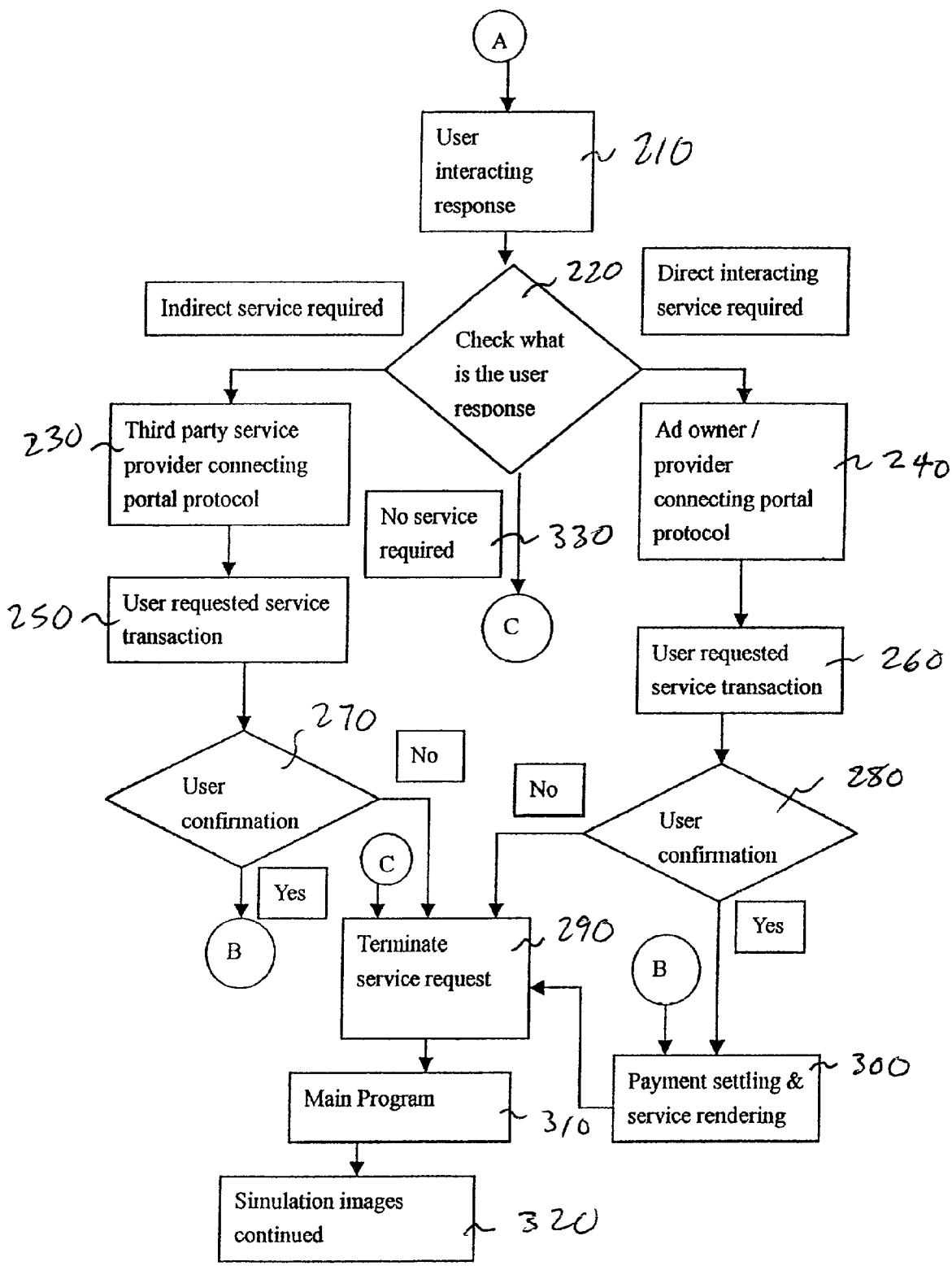
FIG. 13 is a continuation of the flowchart of FIG. 12.

If a response to the advertisement is solicited, the controller receives the user response (step 210), as illustrated in FIG. 13, checks the response (step 220), and forwards it to the third party service provider (step 230) or owner/sponsor (step 240). If the response is in the form of a user requested transaction (steps 250,260), a confirmation is requested from the user (steps 270,280) and the transaction is either terminated (step 290), or payment is made and/or the transaction is otherwise carried out or completed (step 300) before termination, after which the controller returns to the main program (step 310) and continues inserting images (step 320). If the user does not request a transaction (step 330), then the controller skips the response forwarding, confirmation, and transaction completion steps.

Figure 14:
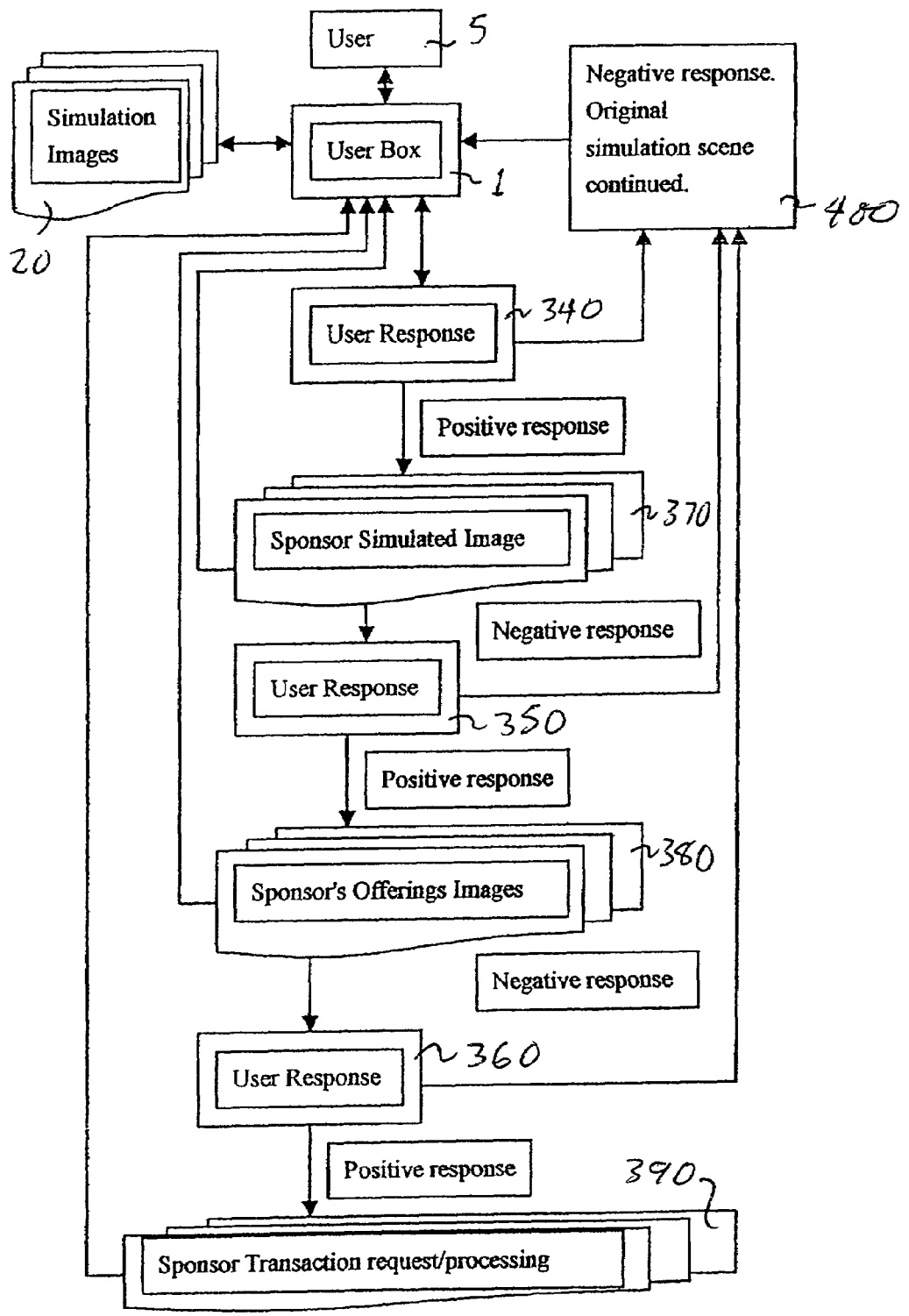
FIG. 14 is a functional block diagram of a variation of the system of FIG. 7.

In the variation illustrated in FIG. 14, the user box processes all user responses without intervention, during the display/response process, by the provider or sponsor/owner as in FIGS. 12 and 13. As in FIGS. 9 and 10, simulation data 20 is sent to the user box 1, which displays a program and advertisements, and which receives responses from the user 5. If the user response (blocks 340–360) is positive, the program proceeds to display additional images based on the original image, such as displays of product or service offerings, and transaction request/processing pages or displays (blocks 370–390). If the user response is negative, then the controller returns to the original program (step 400)

The system of the invention can be set up using a log-in process in which the identity and location of the user is determined and stored in a suitable packet, either on the user's computing device or at the content providers location. During such a log-in process, the user's computing device, or a computing device at the premises of the provider can then:

(i) start to set up a secure communication link in according to the available security technology;
   (ii) set up a communication procedure that facilitates updating of the necessary information that will be processed by the user's computing device into entertaining images;
   (iii) bi-directionally send the necessary data updating information in the related device's data memory to be used in the entertainment.

After the initial log-in process, the user's device is now ready to be used as what was originally designed for. The user can now start to enjoy what the user has originally started out with, and all the above mentioned processes will have a minimum impact on the performance of the user's original entertainment intention. From the point of view of the user, the processes illustrated in FIGS. 8–14 result in the following:

(i) During play in the entertainment environment, if the user decides that the user does not want to be updated, the user's device can use a simulated image that is stored in the device, and the user will not have to worried that any of the above mentioned data will be transmitted;

(ii) During the progress of the entertainment, if the user decides to be updated via the connecting method that the user decides to use, which can be but is not limited to, a direct dial up link to the Internet, then the computing devices at the source of the content or advertisements can then process the necessary data and send it to the user's device via the chosen connecting method;

(iii) The updated information that is received by the user's device is then used during the entertainment, with minimal impact on the quality of the entertainment experienced by the users;

(iv) The user can, during the progress of the entertainment, decide to take a more detailed at the advertising and/or commercials that the user sees during display of the simulation images;

(v) Should the user decide to bypass the advertising and/or commercials that the user sees during display of the entertaining images, nothing will happen except for display of the entertaining images originally intended for in the user's device.

(vi) Should the user decide to "view" the detail of the advertising and/or commercials that the user sees during the display of the entertainment, the user's device may check if such more detailed information is already stored in the device's data memory system;

(vii) If such stored detail information is found, then the user's device displays the detailed advertising and/or commercial information to the user, with or without sound and/or voice;

(viii) Such more detailed information can take a variety forms to express the advertising and/or commercials, which can be but is not limited to, web page styles and/or HTML with suitably available Interpreter programs, applets, scripting and/or similar techniques, detailed design and/or low level programming based on the user's device, (ix) Such more detailed information can be displayed with or without changing the operation environment of the user's device, and the user may or may not need to change from one setting of entertainment environment into another and/or back and forth.

(x) If such stored detail is not found, the user's device can then check with the user if a suitable download of this information is desired by the user;

(xi) If the user decides not to get updated at the time of viewing, the entertainment will resume with its original content;

(xii) If the user decides to accept the updating activity, the user's device will try to get on-line with, by way of example and without limitation, the computing device at the premises of the provider, and then the user's device will try to get the necessary updated data into the user's device's data memory system via a suitable protocol that may identify
  a. the user,
  b. the user's location,
  c. the entertainment type,
  d. the "status" of the entertainment,
  e. the needed (and/or available and/or allowable) specification of the advertising and/or commercials,
  f. the allowable (and/or available and/or needed) space of display for such advertising and/or commercials (with or/without/sound and/or voice), at which time the provider can prepare suitable content for the advertising and/or commercials that can fit the conditions set forth as above mentioned and, after preparation, the providers computing device can then down load the related information into the user's device via the chosen connecting method.

(xiii) If the user decides to respond to the advertising and/or commercials and performs a transaction request, the user can then decide to chose the method of communication, such as, but not limited to, Internet, direct data links, or simple telephone calls, to contact the related parties that can provide the desired product/service;

(xiv) Should the user decide to use the on-line electronic transaction procedure that can be download together with the advertising and/or commercials, such as content compiled from HTML or the commonly known shopping cart approach, the user can then follow the procedure set forth in such an on-line transaction procedure that the user choose to perform the transaction.

(xv) During such a transaction, the advertising or content provider or sponsor can use the computing device at their premises to search and sort out the basic data the user has provided since the purchase of the user's device and/or software and/or the like entertainment devices.

(xvi) Also during such a transaction, the user can decide whether the identifier of the present geographical location where the user is located is to be sent to the related advertising and/or commercial or non-advertising and/or commercial entities.

It will of course be appreciated that any advertisements thus displayed can include suitable sound effects or human voices, either simulated or pre-recorded. Further, although the image location can be pre-determined during the design process, proper programming can also be done that can detect if the receiving party is near the pre-determined locations. In either case, the system sponsor and/or provider or advertising and/or commercial sponsor can determine what image content is best suited to the particular receiving party, and the thus determined images may then be "plugged-in," "cached into," or "blended in" the proper location of the image field. The receiving party thus receives a not-so-annoying image (or "message") and can then decide if to interact with the advertising image area. On-line or off-line transactions can then be performed during the process to make such a "simulation" a more realistic experience.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

What is claimed is:

1. A method of delivering advertising and/or commercials to a user, viewer, or consumer via composite images displayed to the user, viewer, or consumer through a media display device, comprising the steps of:
  displaying a program; and
  inserting, while said program is being displayed, an advertisement into a selected portion of the displayed program, said advertisement being displayed in a manner appropriate to a content of the displayed program so that the advertisement appears to be a part of said content wherein said program is an interactive program, said program having several possible paths, said paths being determined by responses by the user, viewer, or consumer to said content, and wherein said advertisement is updated based on said responses to said content, said responses to said content being submitted by the user, viewer, or consumer, via an interface device.

2. A method as claimed in claim 1, wherein said step of inserting said advertisement comprises the step of merging a simulated image into the program.

3. A method as claimed in claim 2, wherein said simulated image is merged using so-called "blue screen" technology.

4. A method as claimed in claim 3, wherein application of the blue screen technology involves adding blue coloring to portions of a real-life environment.

5. A method as claimed in claim 4, wherein said real-life environment is a sports venue, and said coloring portions of the real-life environment are areas on which advertisements would normally be displayed, including areas selected from the group consisting of billboards, portions of a playing field, and surfaces of an airship, as well as portions of the sports venue on which advertisements may be displayed without detracting from viewing of a sporting event taking place at the venue.

6. A method as claimed in claim 4, wherein said real-life environment is a setting of a musical event, and said advertisements are displayed on a background of a stage.

7. A method as claimed in claim 1, wherein said advertisement is updated in real time.

8. A method as claimed in claim 1, wherein said advertisement is updated by the content provider or advertisement sponsor.

9. A method as claimed in claim 1, wherein the user is given the option of performing on-line or off-line transactions in response to the advertisements.

10. A method as claimed in claim 1, further comprising a login process including the steps of:
 a. determining an identity and location of the user;
 b. organizing the identity and location information into a suitable information packet; and
 c. storing the packet in the user's computing device or in computing devices located in the premises of the provider.

11. A method as claimed in claim 9, wherein said interface device is a computing device, and further comprising the steps of permitting the user to select whether to accept updating of the computing device.

12. A system of delivering advertising and/or commercials to a user, viewer, or consumer via composite images displayed to the user, viewer, or consumer through a media display device, comprising:

means for displaying a program; and means for inserting, while said program is being displayed, an advertisement into a selected portion of the displayed program, said advertisement being displayed in a manner appropriate to a content of the displayed program so that the advertisement appears to be a part of said content, wherein said program is an interactive program, said program having several possible paths, said paths being determined by responses by the user, viewer, or consumer to said content, and wherein said advertisement is updated based on said responses to said content, said responses to said content being submitted by the user, viewer, or consumer, via an interface device.

13. A system as claimed in claim 12, wherein said means for inserting said advertisement comprises means for merging a simulated image into a broadcast program.

\* \* \* \* \*